United States Patent
Smith et al.

(10) Patent No.: US 10,428,945 B2
(45) Date of Patent: Oct. 1, 2019

(54) INLAID RING WITH PLATED LATERAL SIDE

(71) Applicant: Mahle International GmbH, Stuttgart (DE)

(72) Inventors: Thomas J. Smith, Muskegon, MI (US); Alexander S. Cooper, Maple Rapids, MI (US); Robert J. Piccard, St. Johns, MI (US); Timothy Andros, Fowler, MI (US); Claudinei J. de Oliveira, St. Johns, MI (US); Jason P. Bieneman, Ann Arbor, MI (US); Victor H. Tapia Ramirez, Aguascalientes (MX); Terry Pecott, Whitehall, MI (US)

(73) Assignee: Mahle International GmbH (DE)

( * ) Notice: Subject to any disclaimer, the term of this patent is extended or adjusted under 35 U.S.C. 154(b) by 144 days.

(21) Appl. No.: 15/291,427

(22) Filed: Oct. 12, 2016

(65) Prior Publication Data

US 2017/0108122 A1 Apr. 20, 2017

Related U.S. Application Data

(60) Provisional application No. 62/243,496, filed on Oct. 19, 2015, provisional application No. 62/242,792, filed on Oct. 16, 2015.

(51) Int. Cl.
*B23P 15/06* (2006.01)
*F16J 9/26* (2006.01)

(52) U.S. Cl.
CPC .............. *F16J 9/26* (2013.01); *B23P 15/06* (2013.01)

(58) Field of Classification Search
CPC ......... F16J 9/00; F16J 9/12; F16J 9/26; B23P 15/06
See application file for complete search history.

(56) References Cited

U.S. PATENT DOCUMENTS

| 1,435,592 | A | | 11/1922 | Doan et al. | |
|---|---|---|---|---|---|
| 2,488,697 | A | | 11/1949 | Ackerman | |
| 3,583,713 | A | * | 6/1971 | Sugahara | F16J 9/26 277/444 |
| 3,671,047 | A | * | 6/1972 | Umezawa | B23P 15/08 277/444 |
| 4,359,230 | A | * | 11/1982 | Bruni | F16J 9/20 277/444 |
| 4,557,492 | A | | 12/1985 | Tsuchiya et al. | |
| 5,461,776 | A | | 10/1995 | Wood | |
| 5,713,324 | A | | 2/1998 | Frame et al. | |
| 6,013,380 | A | * | 1/2000 | Harayama | C25D 5/18 277/440 |

(Continued)

FOREIGN PATENT DOCUMENTS

CN 104259794 A * 1/2015

*Primary Examiner* — Gilbert Y Lee
(74) *Attorney, Agent, or Firm* — Fishman Stewart PLLC (57) ABSTRACT

A method of forming a piston ring includes providing a base portion formed of a metallic material, the base portion having a first surface, and a second surface that is opposite the first surface, the base portion configured to interface with a piston ring groove. The method includes grinding the first surface to form a reference surface, applying a chromium layer to the second surface, and grinding the chromium layer to reduce a surface roughness of the chromium layer.

20 Claims, 7 Drawing Sheets

(56) References Cited

U.S. PATENT DOCUMENTS

| | | | |
|---|---|---|---|
| 7,458,585 B2* | 12/2008 | Hamada | C10M 141/10 |
| | | | 277/310 |
| 9,079,276 B2 | 7/2015 | Barenreuter et al. | |
| 2005/0100701 A1* | 5/2005 | Hamada | C10M 141/10 |
| | | | 428/36.91 |
| 2005/0218603 A1* | 10/2005 | Fischer | C23C 14/0641 |
| | | | 277/443 |
| 2009/0013866 A1* | 1/2009 | Kariya | F16J 9/067 |
| | | | 92/172 |
| 2009/0174150 A1 | 7/2009 | Smith et al. | |
| 2014/0217677 A1 | 8/2014 | Smith et al. | |
| 2015/0330507 A1* | 11/2015 | Kamura | F02F 5/00 |
| | | | 277/444 |

* cited by examiner

INLAID RING WITH PLATED LATERAL SIDE

CROSS-REFERENCE TO RELATED APPLICATIONS

This application claims priority to U.S. Provisional Patent Application No. 62/242,792 filed Oct. 16, 2015, and to U.S. Provisional Patent Application 62/243,496 filed Oct. 19, 2015, the contents of which are hereby incorporated in their entirety.

BACKGROUND

A power cylinder assembly of an internal combustion engine generally includes a reciprocating piston disposed within a cylindrical cavity of an engine block. One end of the cylindrical cavity is closed while another end of the cylindrical cavity is open. The closed end of the cylindrical cavity and an upper portion or crown of the piston defines a combustion chamber. The open end of the cylindrical cavity permits oscillatory movement of a connecting rod, which joins a lower portion of the piston to a crankshaft, which is partially submersed in an oil sump. The crankshaft converts linear motion of the piston (resulting from combustion of fuel in the combustion chamber) into rotational motion.

The power cylinder assembly typically includes one or more piston rings and a cylindrical sleeve or cylinder liner, which is disposed within the engine block and forms side walls of the cylindrical cavity. The piston rings are disposed in grooves formed in the lateral walls of the piston, and extend outwardly from the piston into an annular space delineated by the piston wall and the cylinder liner. During movement of the piston within the cylindrical cavity, the piston rings bear against the cylinder liner. The piston rings have at least two functions. First, they inhibit gas flow from the combustion chamber into the oil sump through the annular space between the piston and the cylinder liner. Second, they minimize oil flow from the oil sump into the combustion chamber.

Piston rings generally must survive extreme temperatures and pressures resulting from the combustion cycle. Accordingly, the outer surface of a piston ring that bears upon the cylinder liner or bore surface often includes a hard surface coating, or is otherwise treated to create a hardened outer surface that is more durable than an untreated surface. Coatings applied via spraying are inherently difficult to apply accurately, and the piston rings may be masked in some form to prevent sprayed coatings from adhering to surfaces other than the intended outer piston ring surface.

Increases in fuel economy and emission requirements for engines have made surface treatments more desirable for surfaces other than the outermost piston ring surface. However, similar difficulties in masking the desired areas for treatment are inherent, and other piston ring surfaces cannot be masked using the same stacking approach as for outer piston ring surface treatments.

Accordingly, some known power cylinder assemblies include piston rings with a chromium plated lateral side, i.e., the side of the ring positioned to interface with piston ring groove surfaces. However, known chromium coated rings suffer from inadequate layer thickness, typically being approximately 5-10 microns (also referred to as micrometers). Thus, although coated with typically 5-10 microns, during the life of the piston frictional wear can result in early life failure of the piston, due to the extended cyclical loading of the ring within the groove. That is, these chromium layers can wear through before the end of the service life of a piston ring, which can lead to early life failure of the engine.

Additionally, chromium plated coatings that are greater than approximately 5-10 microns can result in a significant amount of waviness that can result in blow-by of combustion products or inadequate scraping action. Also, chromium plating greater than approximately 5-10 microns typically includes nodules that remain after the plating process, which can lead to piston groove wear and early life failure of the engine, as well. The propensity for generating nodules increases as the thickness of the plating increases, and thus layer thickness generally may not be increased without a corresponding increase in surface roughness.

As such, there is a need to improve piston ring designs.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

Reference in the specification to "an exemplary illustration", an "example" or similar language means that a particular feature, structure, or characteristic described in connection with the exemplary approach is included in at least one illustration. The appearances of the phrase "in an illustration" or similar type language in various places in the specification are not necessarily all referring to the same illustration or example.

Various exemplary illustrations are provided herein that include a piston assembly having two or more rings that, when positioned within the grooves of the piston assembly provide various functions during piston operation. In one example, a piston assembly may have two rings that include a combustion ring and a scraping ring. The combustion ring typically blocks a majority of combustion gases from passing the piston assembly of an internal combustion engine, so that there is little or no transfer of gasses to the crank. The scraping ring provides a scraping motion during a downward motion of the piston assembly, and a sliding motion during an upward motion of the piston assembly.

In another example, a three ring piston assembly includes a combustion ring, an oil control ring, and a scraping ring positioned between the combustion ring and the oil control ring. The third or lower oil control ring controls the supply of oil to a liner, which lubricates the piston skirt and the other rings. In some exemplary approaches, a piston assembly may include a piston head having first and second compression ring grooves, compression rings within the grooves, an oil control ring groove, and an oil control ring assembly.

According to various exemplary illustrations, a piston ring may include a radially extending upper surface, a radially extending lower surface, a radially innermost surface extending between the upper surface and the lower surface, and a radially outermost surface extending between the upper surface and the lower surface. The lower surface includes a chromium coating, and both the radially outermost surface and the upper surface lack the coating, according to the disclosure.

Generally, a wear environment between lateral surfaces of the piston ring, e.g., the lower radially extending surface, and the receiving ring groove is different as compared with that typical of the generally vertical, radially outermost surface of the ring and the mating cast iron surface of a cylinder liner. For example, material properties of a machined steel piston ring groove engaging a machined piston ring provide one difference. A second difference relates to the reciprocal vertical movement of the piston ring with respect to the groove surface as the piston moves up and down. Moreover, the ring flexes radially inwardly and radially outwardly, rubbing against the piston ring groove surface during piston operation. Accordingly, disclosed is a method of forming a piston ring that includes providing a base portion formed of a metallic material, applying a chromium layer to a lateral surface of the base portion, the lateral surface configured to interface with a piston ring groove, and grinding the chromium layer to reduce a surface roughness of the chromium layer.

Figure 1:
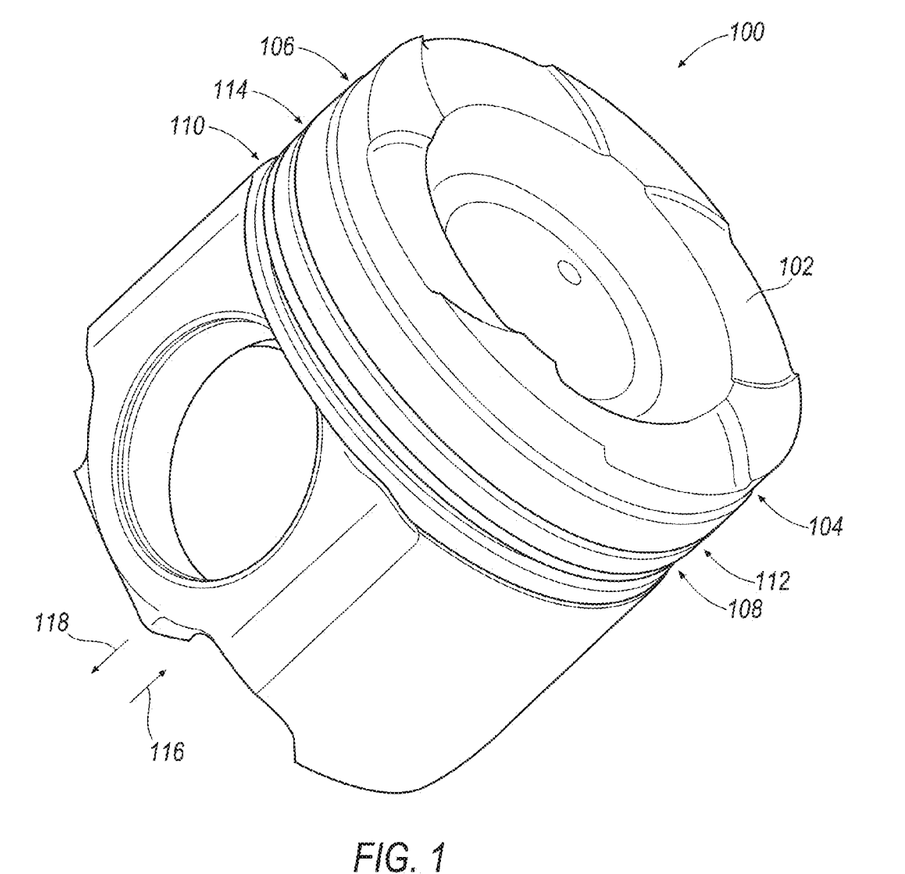
FIG. 1 is a view of an exemplary piston assembly.

Referring to FIG. 1 an exemplary piston assembly 100 is illustrated. Piston assembly 100 includes a piston head 102 including an upper compression ring 104 positioned within an upper compression ring groove 106, and an oil control ring 108 positioned within a lower compression ring groove 110. The piston head 102 further includes a scraping or scraper ring 112 positioned within a middle groove 114. That is, the disclosed scraper ring 112 may be optimally placed within the middle groove 114, as will be further described. The rings 104, 108, and 112 seal against cylinder bore surfaces during reciprocal motion of the piston assembly 100 within a cylinder bore. The piston head 102 moves in a first or upward direction 116 during the upstroke phase of the piston assembly 100 and a second or downward direction 118 during the downstroke phase of the piston assembly 100.

Figure 2A:
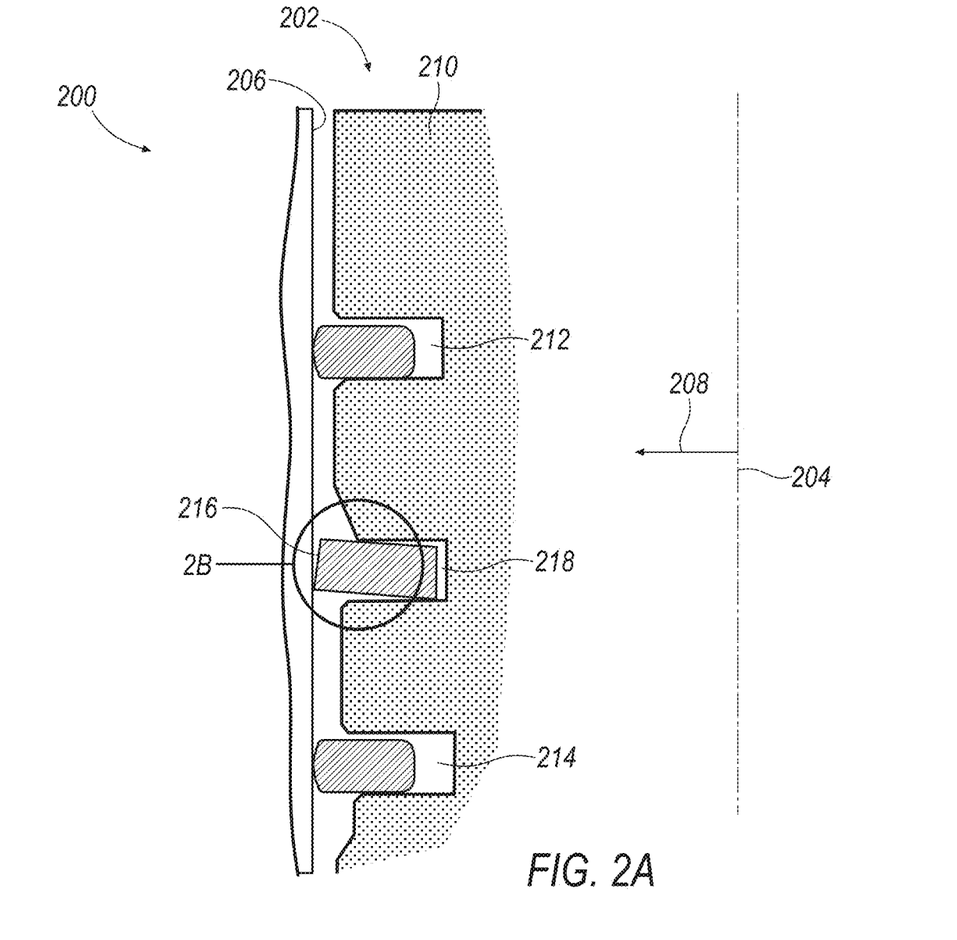
FIG. 2A is a view of the rings of the piston assembly of FIG. 1.

Referring now to FIG. 2A, a piston assembly 200 for an internal combustion engine includes a cylinder bore 202 having a central axis 204 and a cylinder wall 206 that is equidistant from the central axis 204. The piston assembly 200 includes a radial axis 208 that is orthogonal to central axis 204. The piston assembly 200 includes a piston 210 having two or more ring grooves, including a combustion ring and groove 212, an oil control ring and groove 214, and a scraper ring 216 positioned within a scraper ring groove 218.

Figure 2B:
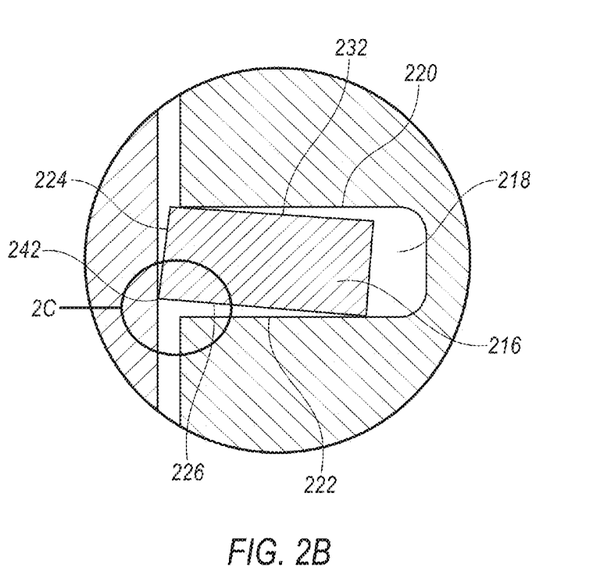
FIG. 2B is a cross-sectional view of an oil scraping ring.

Details of a cross section of scraper ring 216 are shown in FIG. 2B. Referring to FIG. 2B, groove 218 is formed between an upper groove surface 220 and a lower groove surface 222. Scraper ring 216 is positioned within groove 218 such that scraper ring 216 is constrained against upper groove surface 220 when piston 210 moves in downward direction 118 (corresponding with FIG. 1, during which scraping occurs), and scraper ring 216 is constrained against lower groove surface 222 when piston 210 moves in upward direction 116. In one exemplary approach as illustrated herein, scraper ring 216 is positioned within groove 218, between groove 212 and groove 214.

In general, when there are three ring grooves the ring in groove 212 is likely a combustion ring that serves primarily to prevent combustion gases from passing beyond piston 210. The ring in groove 214 typically serves primarily as an oil control ring that controls the distribution of oil for lubrication purposes. Thus, if general practice is followed, ring 216 may be placed in intermediate groove 218. Further, although scraper ring 216 is illustrated in a three-ring design, it is contemplated that scraper ring 216 may also be implemented in other multi-groove designs such as a two-ring groove mechanism, having only a combustion ring and the disclosed scraper ring 216, which would then serve as an oil control ring, as well.

Figure 2C:
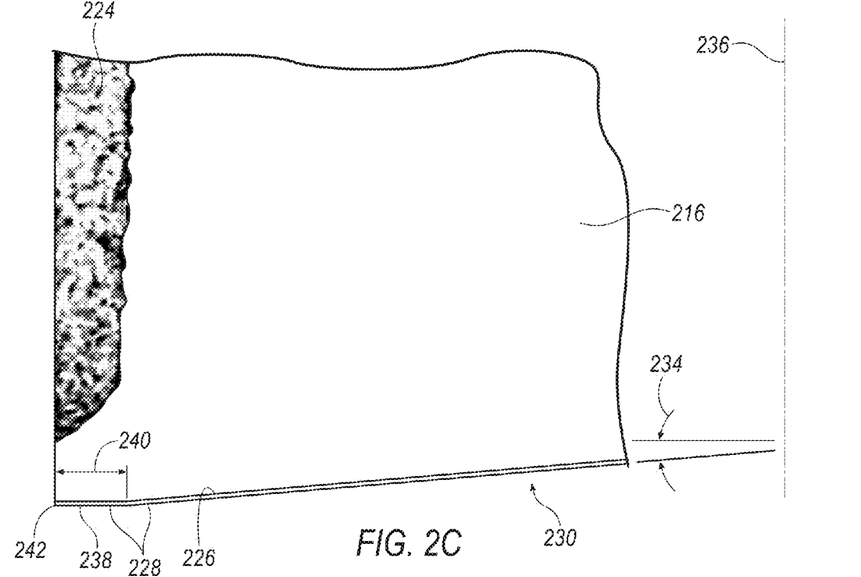
FIG. 2C is an expanded view of a corner of the oil scraping ring of FIG. 2B.

FIG. 2C illustrates an expanded view of a corner of scraper ring 216. Scraper ring 216 includes an outer diameter surface material 224 that, in one example, includes a diamond like carbon (DLC) and additional coating such as a chromium nitride and nickel compound. Outer diamond surface material 224 may have a thickness of approximately 1-2 mm, in the illustrated example. In one example, the chromium nitride and nickel compound is chromium with 40% molybdenum chromium, however, it is contemplated that other chromium compounds may be used as well. In another example, the chromium and nickel compound is applied by thermal spraying process that in one example is a high-velocity, low temperature spraying process known in the industry as HVOF. However, it is contemplated that other methods may be employed to apply the coating, as well, such as by electroplating, physical vapor deposition, or chemical vapor deposition, as examples.

Scraper ring 216 includes a lower surface 226 having a chromium coating 228 that is applied thereto using a disclosed method herein. Lower surface 226 also includes a slight chamfer or bevel 230 having chromium coating 228 applied thereto. Scraper ring 216 includes an upper surface 232, as illustrated in FIG. 2B. In one example, lower surface 226 includes bevel 230 at an angle 234 of approximately 3° to 8° with respect to a central axis 236 thereof. Central axis 236 is defined as a central axis of scraper ring 216 in a free state and prior to assembly into groove 218. Central axis 236 of scraper ring 216 corresponds generally with central axis 204 of cylinder bore 202. Lower surface 226 includes a short portion 238 over a length 240 that does not include bevel 230 or angle 234. Short portion 238 of lower surface 226 is perpendicular or orthogonal to central axis 236, with length 240 having a dimension of between approximately 1 mm and 2 mm.

Bevel 230, having angle 234 is selected to ensure optimal engagement of scraper ring 216 within groove 218 during operation. That is, referring to FIG. 2B, angle 234 is selected to allow a slight amount of freeplay to occur between lower surface 226 of scraper ring 216 and lower groove surface 222 during upward movement 116 of piston 210. Angle 234 also allows a slight amount of freeplay between upper surface 232 of scraper ring 216 and upper groove surface 220 during downward movement 118 of piston 210. If angle 234 is too large, then the clearance may allow excessive freeplay between the upward movement 116 and the downward movement 118, which can cause excessive and premature wear on lower surface 226 and upper surface 232. On the other hand, if angle 234 is too small (i.e., less than 3° and approaching 0°), then scraper ring 216 can bind within groove 218, which can reduce performance thereof during the reciprocating motion, such as causing blowby to occur.

Short portion 238, having no angle 234, results in a slightly increased angular orientation of a contact point or corner 242 of scraper ring 216, with respect to cylinder wall 206, thereby improving the scraping action particularly during downward motion 118. Accordingly, angle 234 is optimally selected to leave sufficient freeplay of scraper ring 216 within groove 218 during reciprocating operation of piston 210, but because angle 234 does not extend to corner 242, scraping is improved due to the slight increased relative angle of lower surface 226 with respect to cylinder wall 206.

Figure 3:
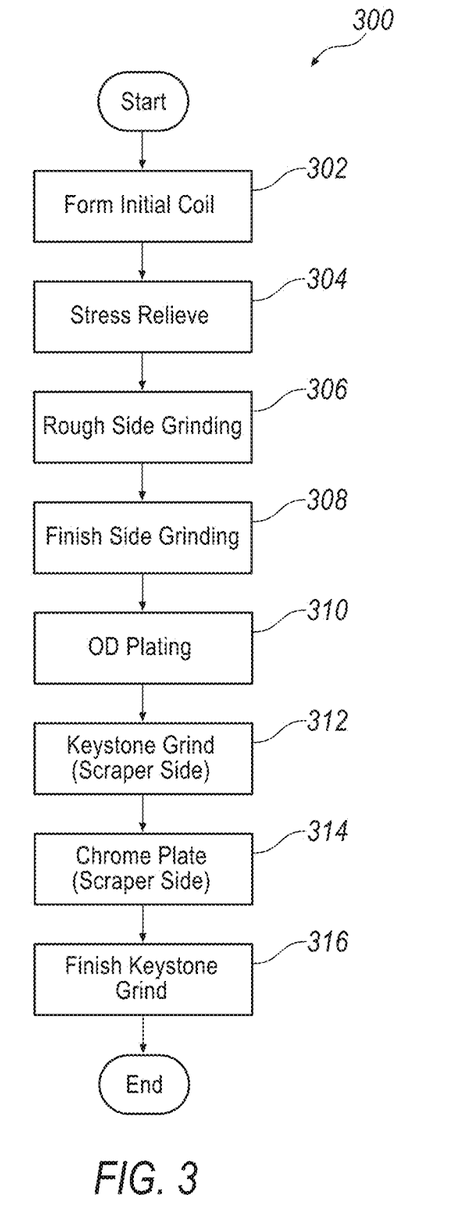
FIG. 3 is a process for fabricating a ring, according to one disclosed example.

Coating 228 is applied according to method 300 as illustrated in FIG. 3 and disclosed herein. In the illustrated example, method 300 includes a series of steps, with the primary steps disclosed that pertain particularly to fabrication of chromium coating 228. It is contemplated, however, that additional or fewer steps may be applicable to both the fabrication of chromium coating 228 and also the fabrication of scraper ring 216, which may not be relevant to fabrication of the chromium coating. For instance, by way of non-limiting examples, steps may be applied for aqueous washing, application of a "pip" mark for identifying sides of scraper ring 216 during its fabrication, fabrication of a gap within scraper ring 216, and grinding and coating on an outer diameter of scraper ring 216.

Figure 4A:
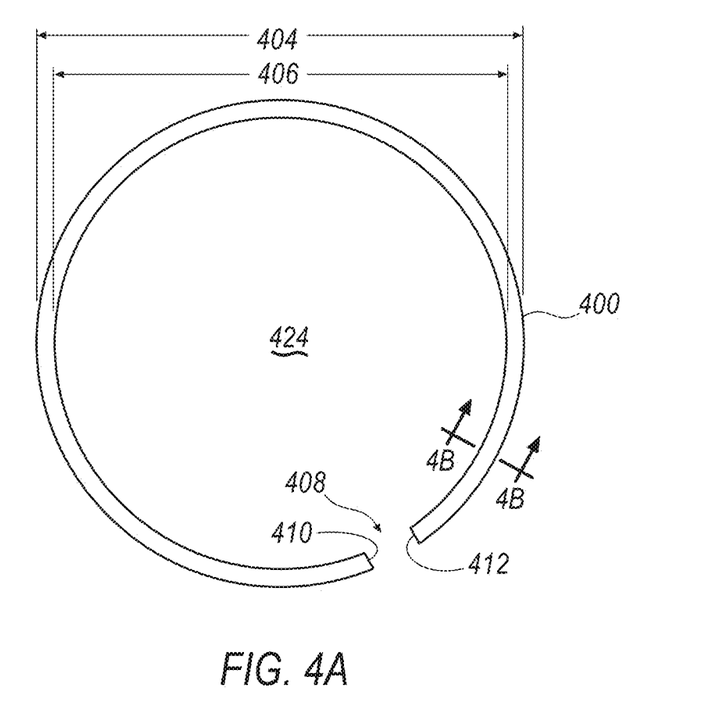
FIG. 4A is a plan view of a scraper ring prior to processing according to the disclosed method.
Figure 4B:
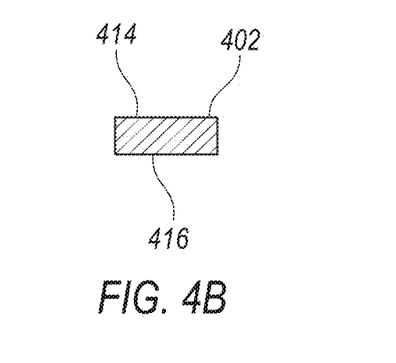
FIG. 4B is a cross-sectional view of the scraper ring of FIG. 4A.

Referring to FIGS. 3 and 4A, method 300 starts and at step 302 a base portion or coil 400 is formed of a wear-resistant metal material such as cast iron or steel. Coil 400 is stress relieved as illustrated at step 304 to have a generally uniform and rectangular cross-section 402 about its entire circumferential length. FIG. 4B shows a cross-section 402 of coil 400 that is generally uniform about its circumference. Coil 400 includes an outer diameter 404 and an inner diameter 406. A gap 408 is formed between a first end 410 and a second end 412 of coil 400. Gap 408 is selected based on the dimensional requirements of scraper ring 216, such that it can be positioned over piston 210 by elastically bending and distorting scraper ring 216 during its installation over piston 210 and into groove 218, without causing plastic damage to scraper ring 216. The stress relieving of step 304 takes place generally at a temperature particular to the material being used, and using sufficient time to minimize internal stresses created during the initial fabrication processes, yielding a relaxed base portion for further processing. Stress relieving is typically accomplished by heating the material below its critical temperature for sufficient time so that recrystallization of the base metal may occur.

At step 306, a surface 414 of the base portion is rough ground, and at step 308 surface 414 is then finish ground. After both rough grinding 306 and finish grinding 308, cross-section 402 remains generally rectangular, with surface 414 and an opposing surface 416 generally parallel with one another, with surface 414 having been finish ground, but surface 416 with a rougher surface having not yet been ground. Outer diameter 404 may also be ground or otherwise formed or processed, having appropriate dimensions with respect to surfaces 414, 416 for use within piston assembly 200 upon completion of processing. At step 310 outer diameter (OD) 404 is plated with a coating 224 that is harder than its base material, using for example the DLC and additional coating as described above.

Thus, for controlling flatness and surface quality, surface 414 is both rough ground 306 and finish ground 308. In such fashion, subsequent processing (grinding, plating, etc. . . . ) of surface 416 that opposes surface 414 (which will become lower surface 226 of FIGS. 2B and 2C), occurs relative to base surface 414, which will serve as reference during such processing as outlined below.

Figure 4C:
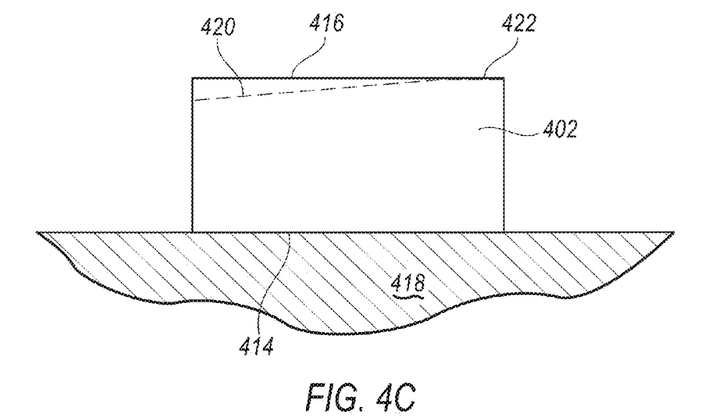
FIG. 4C illustrates a cross-sectional view of the scraper ring of FIG. 4A during processing steps of FIG. 3.
Figure 4D:
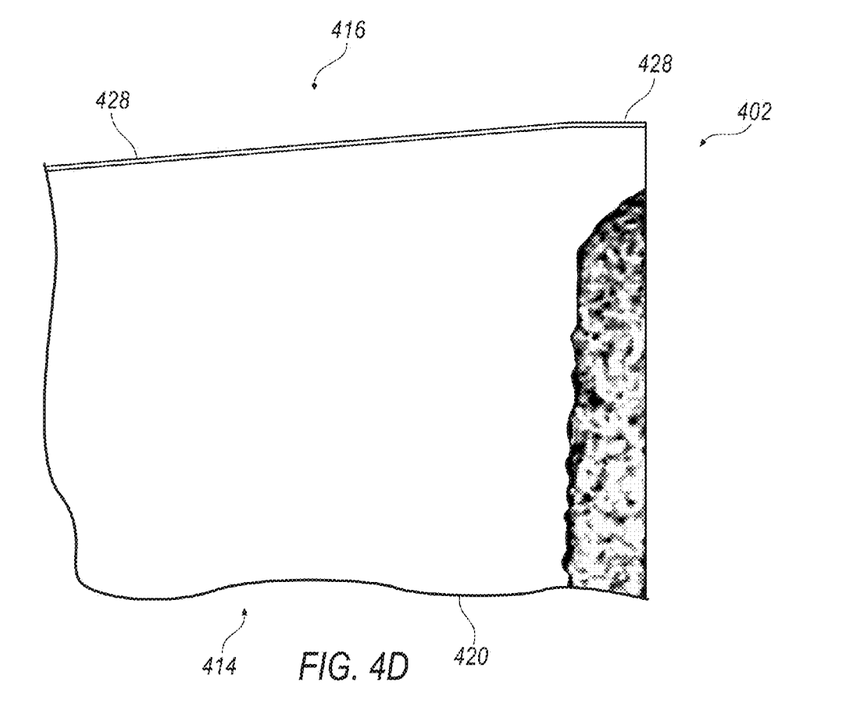
FIG. 4D is a cross-sectional view of the scraper ring after grinding.

Referring to FIG. 4C, subsequent processing steps related to surface 416 are illustrated therein, which illustrate the steps for finish processing of lower surface 226 as discussed with respect to FIGS. 2B and 2C. Cross-section 402 of coil 400 is illustrated, having surface 416, with surface 414 that is positioned on a base surface 418. Base surface 418 serves as a reference surface for subsequent processing steps. Because of both rough grinding step 308 and finish grinding step 310, subsequent machining or grinding of material on surface 416 results in extremely accurate finish surface characteristics. That is, surface 414, having been formed first with rough grinding step 306 and finish grinding step 308, provides an extremely flat surface, as well as an extremely low roughness, which will translate into improved surface characteristics during subsequent processing steps of surface 416. In one example, surface 414 includes a flatness or waviness about the circumference of coil 400 of approximately less than 10 microns, and in some instances may be approximately 3 microns, measuring a peak to peak surface around the coil 400. As such, with surface 414 having been finished with steps 306 and 308, surface 414 thereby provides a highly flat and smooth surface that, when placed upon base surface 418, allows for very accurate processing steps of surface 416.

At step 312, surface 416 is ground to form a keystone surface 420, which corresponds with lower surface 226 of FIG. 2C (as well as bevel 230 thereof). As will be further discussed, keystone surface 420 is rough ground and, due to the subsequent steps as will be illustrated, includes a surface flatness and roughness that may be cumulatively 25 microns or more, peak to peak. Generally, as understood in the art, "peak to peak" refers to cumulative flatness and roughness and is defined herein as the cumulative range of surface qualities that are measurable, accounting for both flatness and roughness variations over a given surface. Thus, in this example, a surface probe or other measuring device may be used to measure the total cumulative effect of both surface flatness and surface roughness over the entire surface, such that a measured maximum and minimum between the two is 25 microns. Formation of keystone surface 420 includes leaving a short length 422 of surface that does not include any bevel, as described with respect to short portion 238 above. That is, keystone or "scraper" surface 420 is formed having a bevel, such as bevel 230 of FIG. 2C 226, formed by grinding at step 312.

Figure 4E:
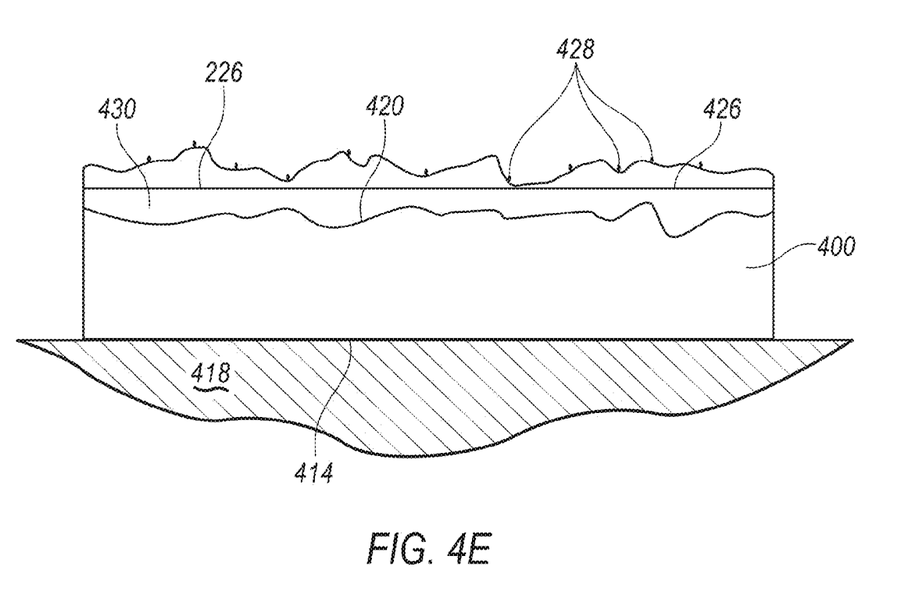
FIG. 4E is a graphical illustration of a coil as viewed from an inner region thereof during chromium plating and processing.

At step 314, surfaces 420, 422 are chrome plated. In one example, step 314 includes applying chromium layer 426 with an electroplating technique. Chromium layer 426 is applied, in one example, with approximately 50 microns of thickness in average, which is sufficient to accomplish a number of items as described herein and illustrated in FIG. 4E. It is contemplated, however, that greater than 50 microns of average chromium thickness may be applied as layer 426, so long as sufficient thickness of chromium is provided for the subsequent steps and purposes as disclosed herein. FIG. 4E is a graphical illustration of coil 400 as viewed from an inner region 424 (FIG. 4A) thereof. Thicknesses and lengths are not illustrated in proportion to actual corresponding thicknesses about the circumference of coil 400, but are shown with enhanced vertical dimensions for discussion purposes. Also, FIG. 4E illustrates thickness and flatness only, and does not include illustration as it relates to bevel 230.

Referring to FIG. 4E, surface 414 of coil 400 is positioned on base surface 418. Keystone surface 420, having been rough ground, includes a relatively rough and wavy surface compared to surface 414. A chrome layer 426 is applied thereto at step 314, having an average thickness, in one example, of 50 microns. Chromium, however, in such thicknesses is difficult to apply uniformly, and is notorious for including waviness and roughness well in excess of 25 microns peak to peak. Nodules 428 are also illustrated, having been undesirably formed during chromium deposition, as is known to occur in thicker chromium deposition thicknesses, such as 50 microns.

As such, according to the disclosure, chromium is applied in sufficient thickness to account for: 1) the inherent waviness and roughness of the keystone surface 420 after its rough grind at step 312; 2) the inherent waviness and roughness of chromium layer 426 when applied in such a thickness; and 3) the nodules 428 that are inherently formed when forming the chromium layer. Therefore, due to the 50 microns thickness of chromium plating, it is contemplated that the subsequent finish keystone grinding step 316 thereby reduces the overall chromium plating to a thickness of at least 20 microns, and in one example approximately 25 microns, having a final lower surface 226 with a waviness and flatness of approximately 10 microns, as well.

Thus, although it is known that chromium plating can result in a waviness, for a plating thickness of approximately 50 microns, subsequent grinding of the chromium plating surface thereby reduces the overall amount of resultant waviness, due to the disclosed process in which surface 414 is first formed, and from which final grinding of the chromium plating is referenced when surface 420 is final ground with respect to base surface 418. It is further contemplated that, although the disclosed thickness of chromium deposited is approximately 50 microns, the amount of deposited chromium may be more or less than this amount, depending on the application. Regardless, it is contemplated that the disclosed process nevertheless results in an acceptably small amount of waviness of the final chrome-plated surface 226 due to the final grinding process that is performed off of surface 414 that is prepared as a reference or base surface with highly accurate surface characteristics.

Accordingly, a number of desired outcomes result from the disclosed process. Surface 414 is formed using both rough grinding and finish grinding steps, resulting in a very smooth and essentially wave-free base surface that serves as a base for finish processing of surface 420. Surface 420, however, need not be smooth or flat to its finished requirements because of the amount of thickness of chromium to be applied and then subsequently ground. The chromium applied as layer 426, as well, also need not be smooth, flat to its finished requirements, or free of nodules. Instead, chromium layer 426 with its inherent waviness, roughness, and noduled surface, is applied in sufficient thickness such that the final grind at step 316 accounts for its inherent waviness and roughness, as well as that of rough ground surface 420, with its inherent waviness and roughness, while leaving 20 to 25 microns in average thickness in a final layer 430 to provide improved life for piston 210, and having a finished waviness and flatness that is less than 10 microns peak to peak. In the process, as well, finish keystone grinding of step 316 removes the nodules 428 formed during chromium plating step 314, as well.

In addition, although the disclosed method is described as pertaining to a ring that is in the middle groove of the three grooves illustrated in FIGS. 1 and 2A, it is contemplated that the disclosed method and apparatus may be used in any of the ring grooves, in which wear occurs due to frictional wear of the ring in the groove, or improved flatness is needed to better seal the ring against the piston to control the blow-by of oil and/or combustion gases.

It is to be understood that the above description is intended to be illustrative and not restrictive. Many applications other than the examples provided would be upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the disclosure is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of forming a piston ring, comprising:
providing a base portion formed of a metallic material, the base portion having a first surface and a second surface that is opposite the first surface, the base portion having an outer surface extending from the first surface to the second surface;
finish grinding the first surface to form a reference surface such that the second surface is rougher than the first surface;
positioning the reference surface on a base surface;
while the reference surface is positioned on the base surface, forming a bevel surface from the second surface while leaving an unbeveled portion of the second surface extending from the outer surface to a start of the unbeveled portion;
applying a chromium layer to the bevel surface and to the unbeveled portion, and not to the first surface; and
grinding the chromium layer to reduce a surface roughness of the chromium layer.

2. The method according to claim 1, further comprising forming a coil from the metallic material to make the base portion.

3. The method according to claim 1, wherein:
applying the chromium layer includes forming nodules on the chromium layer; and
grinding the chromium layer includes removing the nodules from the chromium layer.

4. The method according to claim 1, wherein applying the chromium layer includes electroplating the chromium layer.

5. The method according to claim 1, wherein applying the chromium layer includes applying the chromium layer to an average thickness of at least 50 microns.

6. The method according to claim 1, wherein grinding the chromium layer includes reducing a thickness of the chromium layer to have cumulative surface waviness of approximately 25 microns peak to peak.

7. The method according to claim 1, wherein grinding the chromium layer includes finish grinding a thickness of the chromium layer to have a peak to peak surface waviness of approximately 10 microns peak to peak.

8. The method according to claim 7, wherein the angle is between approximately 3° and 8°.

9. The method according to claim 1, wherein forming the bevel surface further comprises grinding the second surface, prior to applying the chromium layer, to an angle with respect to the reference surface.

10. The method according to claim 1, wherein forming the bevel surface further comprises forming the bevel surface from the start of the unbeveled portion to an inner surface of the piston ring that is opposite the outer surface.

11. The method according to claim 1, wherein grinding the chromium layer includes grinding the chromium layer while the reference surface is positioned on the base surface.

12. A piston ring, comprising:
a base portion formed of a metallic material, the base portion having a first surface and a second surface that is opposite the first surface;
an outer contact surface extending between the first surface and the second surface;
the second surface including a bevel surface and an unbeveled portion that extends from the outer contact surface to a start of the unbeveled portion; and
a chromium coating layer applied to the bevel surface and to the unbeveled portion, but not applied to the first surface, the chromium coating layer defining a thickness of at least 20 microns.

13. The piston ring according to claim 12, wherein the chromium layer has a thickness of approximately 25 microns.

14. The piston ring according to claim 12, wherein the first surface forms a reference surface from which the bevel surface is defined, with the bevel surface at an angle with respect to the reference surface.

15. The piston ring according to claim 14, wherein the angle is between approximately 3° and 8°.

16. A piston ring, comprising:
a base portion formed of a metallic material, the base portion having a first surface and a second surface that is opposite the first surface;
an outer contact surface extending between the first surface and the second surface; and
a chromium coating layer on the second surface of the piston ring and not on the first surface, the chromium layer having a thickness of at least 20 microns.

17. The piston ring according to claim 16, wherein the chromium coating layer has a surface waviness and roughness that is less than 10 microns peak to peak.

18. The piston ring according to claim 16, wherein the outer contact surface includes a coating that is harder than the base portion.

19. The method according to claim 16, wherein the second surface includes a bevel surface and an unbeveled portion that extends from the outer contact surface to a start of the unbeveled portion.

20. The piston ring according to claim 19, wherein the first surface forms a reference surface from which the bevel surface is defined, with the bevel surface at an angle with respect to the reference surface, wherein the angle is between approximately 3° and 8°.

* * * * *